Sept. 24, 1935.  L. L. FOUNTAIN  2,015,555

LOAD CONTROL SYSTEM

Filed April 14, 1934  4 Sheets-Sheet 1

WITNESS  INVENTOR
Lawrence L. Fountain
BY
ATTORNEY

Sept. 24, 1935.           L. L. FOUNTAIN           2,015,555
                         LOAD CONTROL SYSTEM
                        Filed April 14, 1934        4 Sheets-Sheet 2

WITNESS
INVENTOR
Lawrence L. Fountain
BY
ATTORNEY

INVENTOR
Lawrence L. Fountain
BY
ATTORNEY

Sept. 24, 1935.                L. L. FOUNTAIN                2,015,555
LOAD CONTROL SYSTEM
Filed April 14, 1934            4 Sheets-Sheet 4
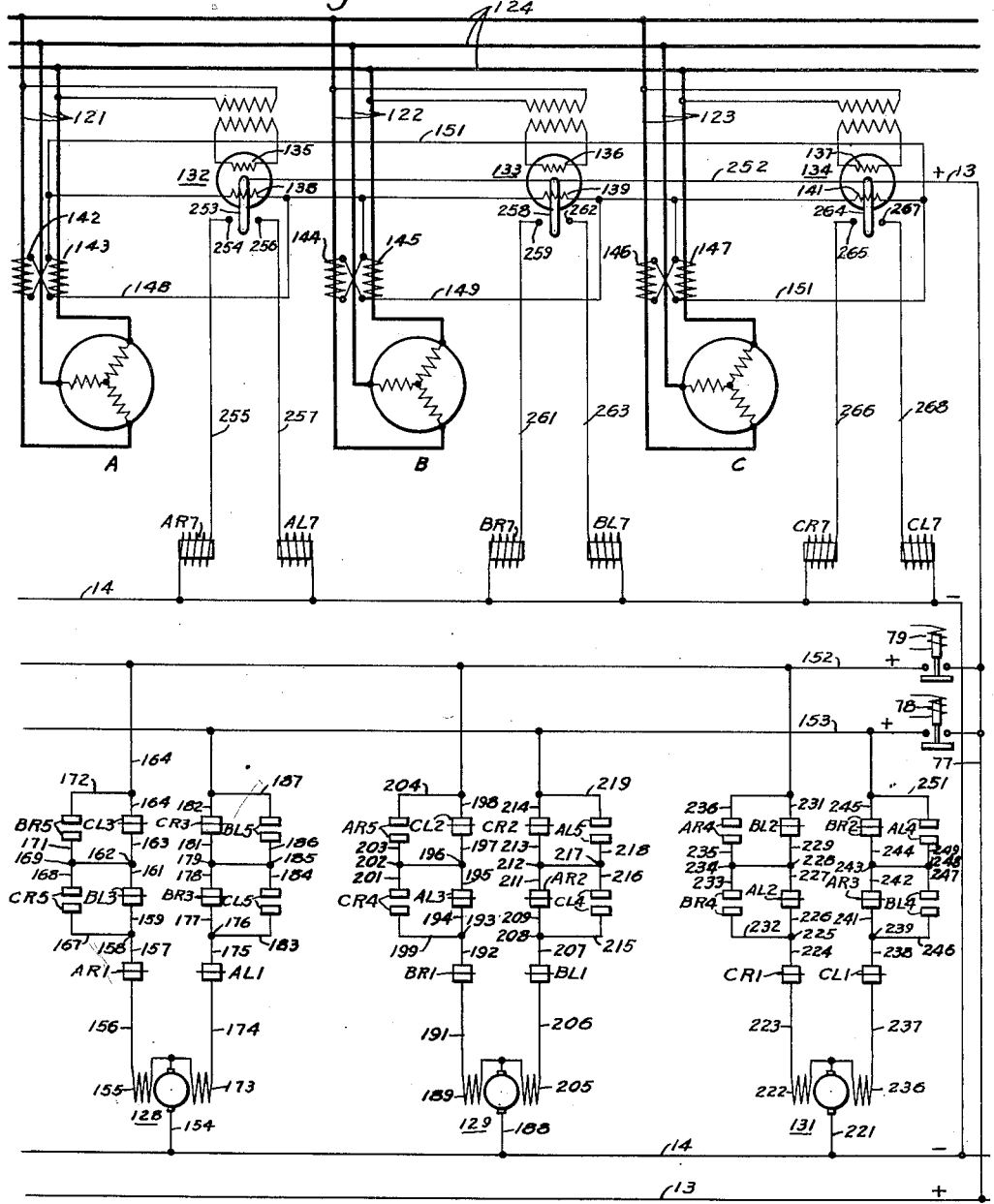

Patented Sept. 24, 1935

2,015,555

UNITED STATES PATENT OFFICE 2,015,555

LOAD CONTROL SYSTEM

Lawrence L. Fountain, Wilkinsburg, Pa., assignor to Westinghouse Electric & Manufacturing Company, East Pittsburgh, Pa., a corporation of Pennsylvania Application April 14, 1934, Serial No. 720,619

7 Claims. (Cl. 290—4)

My invention relates to regulating systems and more particularly to regulator systems for controlling the division of load between a number of parallel operated electrical generators.

In accordance with my invention, means is provided that is actuated in accordance with the quantity that is to be maintained constant, such as total load output from a plurality of generators operated in parallel, or the frequency of the alternating-current wave supplied from said generators. This means, which may be a load responsive relay, operates to energize control circuits for increasing or decreasing the power input to the prime movers driving the several generators. Load balanced relays are provided that are responsive to the relative loads between the several generators, and operate to select certain of the several generators to respond to specific required variations in power input resulting from the operation of the load responsive relay, or equivalent device, for controlling the power input to the entire group of generators.

In the drawings:

Fig. 3 is a simplified schematic diagram of certain of the control circuits employed in the embodiment of the invention illustrated in Fig. 2.

Figure 1:
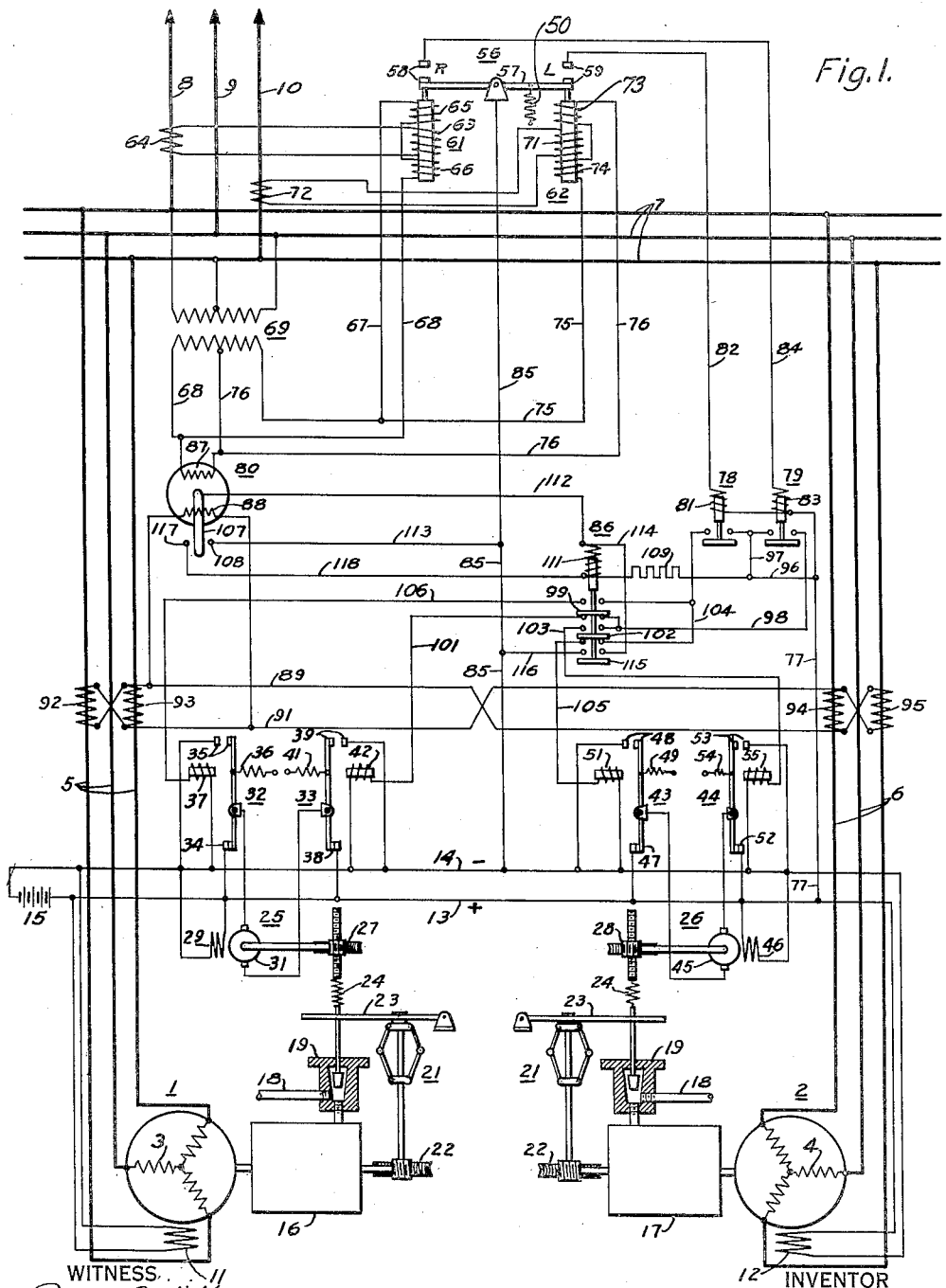
Figure 1 is a diagrammatic view of circuits and apparatus illustrating one preferred embodiment of my invention for use where two generating units are employed.

Referring to Fig. 1, two generators 1 and 2 are illustrated having armature windings 3 and 4, respectively, connected to output circuits 5 and 6 for delivering power to the common station bus bars 7, from which power is supplied to an outgoing transmission line represented by conductors 8, 9 and 10. The generators are provided with field windings 11 and 12, respectively, that are energized from conductors 13 and 14 that are connected to any convenient source of direct current supply, such as the battery 15.

The generators 1 and 2 are driven, respectively, by prime movers 16 and 17, which may be water wheels, steam turbines, or any equivalent prime moving apparatus. Each prime mover is provided with a conduit 18, through which motive fluid is supplied, and a valve 19 that is operated to control the rate of supply of power input to the prime mover. A speed governing device 21 is provided, which may be any suitable known type, and is driven through a suitable gearing 22 in accordance with the speed of the prime mover and generator driven thereby. The governing device 21, actuated in accordance with the speed of its associated prime mover, moves a valve control lever 23 to partially close or partially open the valve 19 upon variations in the speed of the associated generating unit from its desired valve. The force acting upon the lever 23 by the centrifugal governing device is opposed by the action of a spring 24, the tension of which may be controlled to adjust the setting of the governing device.

Governor controlling motors 25 and 26 are respectively provided for adjusting the setting of the units associated with the generators 1 and 2 through suitable gearing mechanisms 27 and 28. The motor 25 is provided with a field winding 29 that is connected to the supply conductors 13 and 14 and with an armature winding 31 that is connected to the lever arms of motor reversing switches 32 and 33. The switch 32 is provided with lower cooperating contact members 34 and upper contact members 35, a biasing member 36 for forcing the moving arm of the switch to its illustrated operative position, and an electromagnet having the winding 37 which, when energized, operates the lever arm against the bias of the member 36 to a second operative position, causing separation of the contact members 34 and engagement of the contact members 35. The switch 33 is similar in construction to the reversing switch 32 and is provided with lower contact members 38 and upper cooperating contact members 39, a biasing member, or spring, 41 that acts to bias the switch to its illustrated position, and an electromagnet having winding 42 for actuating the switch from its illustrated position, causing separation of the contact members 38 and engagement of the contact members 39. The armature winding 31 of the motor 25 is connected through the switches 32 and 33, in their illustrated positions, to the supply conductor 13, so that no voltage is impressed across the motor winding. Should the one or the other of the switches 32 or 33 be actuated to its second operative position, the one or other terminal of the motor armature 31 will be connected through the upper contact members 35 or 39 of the reversing switch 32 or switch 33 to the supply conductor 14, thus impressing a voltage upon the motor armature in the one or other direction, depending upon which of the reversing switches is so actuated, to operate the motor in a direction to increase or decrease the power input to the generating unit.

The governor adjusting motor 26, associated with the prime mover 17, is provided with reversing switches 43 and 44, that are similar in construction to the switches 32 and 33, and provide for similarly connecting the armature winding 45 of the motor 26 to the supply conductors 13 and 14, the field winding 46 being permanently connected thereto. The switch 43 comprises lower cooperating contact members 47 and upper cooperating contact members 48, that are urged to their illustrated positions by the spring or biasing member 49, in opposition to which an electromagnet, having a winding 51, operates the switch when energized. The switch 44 is likewise provided with lower contact members 52, upper contact members 53, the biasing member 54 and an electromagnet having a winding 55.

A load responsive relay 56 is provided, and is responsive to the watts output flowing in the transmission line represented by the conductors 8, 9 and 10. The relay 56 comprises an arm 57, cooperating pairs of contact members 58 and 59 controlled thereby and actuated by electromagnets 61 and 62. The magnet 61 is provided with a current coil 63, energized from the secondary winding of a current transformer 64, the primary winding of which is connected in series with the conductor 8 of the transmission line. The electromagnet 61 is also provided with voltage windings 65 and 66 that are connected in series circuit relation and differentially related with respect to one another, and positioned on opposite sides of the current coil 63 about the movable core of the electromagnet 61. The windings 65 and 66 are connected by conductors 67 and 68 to the outer terminals of the three-phase voltage transformer 69 in such manner as to be responsive to the voltage between the line conductors 8 and 9.

The electromagnet 62 is provided with a moving core member connected to the lever arm 57 and is surrounded by a current coil 71 about the central portion thereof, that is connected to be energized from the secondary winding of the current transformer 72, the primary winding of which is connected in series with the supply conductor 10 of the transmission line. On opposite sides of the current coil 71, differentially related voltage coils 73 and 74 are positioned and connected in series circuit relation with each other, and by conductors 75 and 76 to the right hand terminal and midpoint respectively of the secondary winding of the voltage transformer 69, or so as to be responsive to the voltage between conductors 9 and 10 of the transmission line.

The relay 56 is responsive to the watts output of the circuit represented by conductors 8, 9 and 10, and, upon a variation in the power flowing through this circuit from the value for which the relay 56 is adjusted, it will operate to close a circuit through the one or the other of the cooperating pairs of contact members 58 or 59, to cause a raising or a lowering of the power input to the generating units. Thus when the output of the circuit 8—9—10 rises above the said given value, the magnets 61 and 62 increase their biasing action, which they respectively exert downwardly and upwardly, upon the center-pivoted member 57 and thus rotate it, against the action of a tension spring 50, in a counter-clockwise direction to close the contact members 59. Similarly, when the circuit output falls below the value for which the relay 56 is adjusted, the spring 50 is permitted to bias the pivoted member 57 in the opposite direction to effect a closure of contact members 58.

The input-lowering circuit above referred to may be traced from the supply conductor 13, by conductor 77 to the operating coil of the direction relay 78, thence through the winding 81 of this relay, conductor 82, and contact members 59 to the lever arm 57 of the relay 56, and then by the conductor 85 to the supply conductor 14. The input-raising circuit is similar to the one just traced except that it includes the winding 83 of a second direction relay 79, a conductor 84, and the contact members 58 of the relay 56.

A load balancing relay 80 of the reverse-power sensitive type is provided for controlling the operation of a machine selecting relay 86 that determines which of the two prime mover units, 16 or 17, is to be controlled in response to a specific impulse from the load responsive relay 56. The load balancing relay 80 is provided with a voltage winding 87 and a current winding 88, that is connected to the conductors 89 and 91 which are cross-connected between the secondary windings of current transformers 92 and 93 in the output circuit from the generator 1, and current transformers 94 and 95 in the output circuit from the generator 2. Since the current transformers in these two generator output circuits are connected in the corresponding conductors of the circuit and are cross-connected, their voltages are differentially related and oppose the flow of current in the circuit comprising conductors 89 and 91 when a balanced relation exists in the current output of the two machines. Upon a variation in the output of the two members from this balanced condition, the voltage from the current transformers corresponding to the machines having the greater output will more than equalize that from the current transformers of the other machine, thus producing circulating current between the transformers in the two generator output circuits and a voltage across the winding 88 of the load balancing relay 80 in a direction to cause operation of the relay in accordance with which of the two machines is delivering the greater output. The current transformers in the two output circuits may, of course, be so adjusted that the balanced condition corresponds to any particular ratio of power output from the two machines, for example, a ratio depending upon the normal capacities of the machines.

The load balancing relay 80 and the machine selecting relay 86 together partially establish control circuits that determine which of the prime movers 16 or 17 will, at any particular time, in response to the operation of the relay 56, receive an adjustment of the governor mechanism to increase its power input, and which will receive an adjustment of its governor mechanism to decrease the power input. The relay circuits are so arranged that when the output of generator 2 is greater than that of generator 1, the machine-selecting relay 86 will occupy the position illustrated. With the relay 86 in its illustrated position, an operation of the relay 56, as results when the output of circuit 8—9—10 falls below the value for which the relay is set, to cause engagement of its cooperating contact members 58 will cause operation of the motor 25 in a direction to increase the power input to the prime mover 16, and will prevent operation of the motor 26. Upon engagement of the contact members 59 of the relay 56, the motor 26 will be operated in a direction to decrease the power input to the prime mover 17, while the relay 86 will prevent the operation of the motor 25 to change the power input to the prime mover 16. This will be readily apparent by tracing the following circuits.

Upon engagement of the contact members 58 of the relay 56, the direction relay 79 is energized and operated to its circuit closing position to increase the power input to the generators, closing a circuit from the supply conductor 13, through conductor 77, conductors 96 and 97, the contact member of the relay 79, conductor 98, the contact member 99 of the relay 86, conductor 101, the winding 42 of the switch 33, to the supply conductor 14, thus causing operation of the switch 33 to separate contact members 38 and close contact members 39 to operate the motor 25 in a direction to increase the power input to the prime mover 16. It will be noted that in the illustrated position of the switch 86, the contact member 102 thereof will not bridge the circuit between conductors 98 and 103 for energizing the winding 55 of the switch 44, which is necessary to operate the motor 26 in a direction to increase the power input to the prime mover 17. The motor 26, therefore, will not operate under these conditions.

Should the relay 56 operate to cause engagement of its cooperating contact members 59 for lowering the power input to the prime movers, the direction relay 78 will be actuated to close a circuit from supply conductor 13, conductors 77, 96, 97, relay 78, conductor 104, contact member 102 of switch 86, conductor 105, winding 51 of the motor reversing switch 43 to the supply conductor 14, thus causing operation of the switch 43 to separate the contact members 47 and close a circuit through the contact members 48 to operate the motor 26 in a direction to lower the power input to the prime mover 17.

It will be noted that, in the illustrated position of the relay 86, the circuit from conductor 104 and to the conductor 106 for operating the reversing switch 32, controlling the lowering input operation of the motor 25, is interrupted by the relay contact member 99 which is in its lower position. The motor 25 will, therefore, not operate.

If the power output from the generator 2 becomes less than the output from the generator 1, so as to disturb the balanced relation in the cross-connected transformer circuits 89 and 91, the load balancing relay 80 will be operated in a direction to cause engagement of its movable contact member 107 with contact member 108, thus closing a circuit from supply conductor 13 through conductor 77, conductor 96, resistor 109, winding 111 of the relay 86, conductor 112, relay contact members 107 and 108, conductors 113 and 85 to supply conductor 14 operating the relay 86 to its upper or energized position. When so operated, a holding circuit from the upper end of the operating winding 111 through conductor 114, switch contact member 115, conductors 116 and 85 to supply conductor 14 retains the relay 86 in its upper position until the winding 111 is deenergized by the relay 80. In its upper position, the relay contact member 99 connects conductor 104 to the conductor 106 and the relay contact member 102 connects the conductor 98 to the conductor 103, so that the control circuits are so determined by the machine selecting relay 86 that closing of the relay 79 will cause operation of the motor 26 in a direction to increase the power input to the generator 17 while the motor 25 will remain at rest, and operation of the relay 78 will cause operation of the motor 25 in a direction to decrease the power input to the prime mover 16 while the motor 26 will remain at rest.

Upon a reverse in unbalancing relays between the generators 1 and 2 such that the power output of the generator 2 is large with respect to the power output from the generator 1, the contact member 107 of the relay 80 will move to engage the contact member 117, thus deenergizing the winding 111 through the short circuit comprising conductors 112, relay contact members 107 and 117 and conductor 118. This permits the relay 86 to drop to its lower or illustrated position.

Figure 2A:
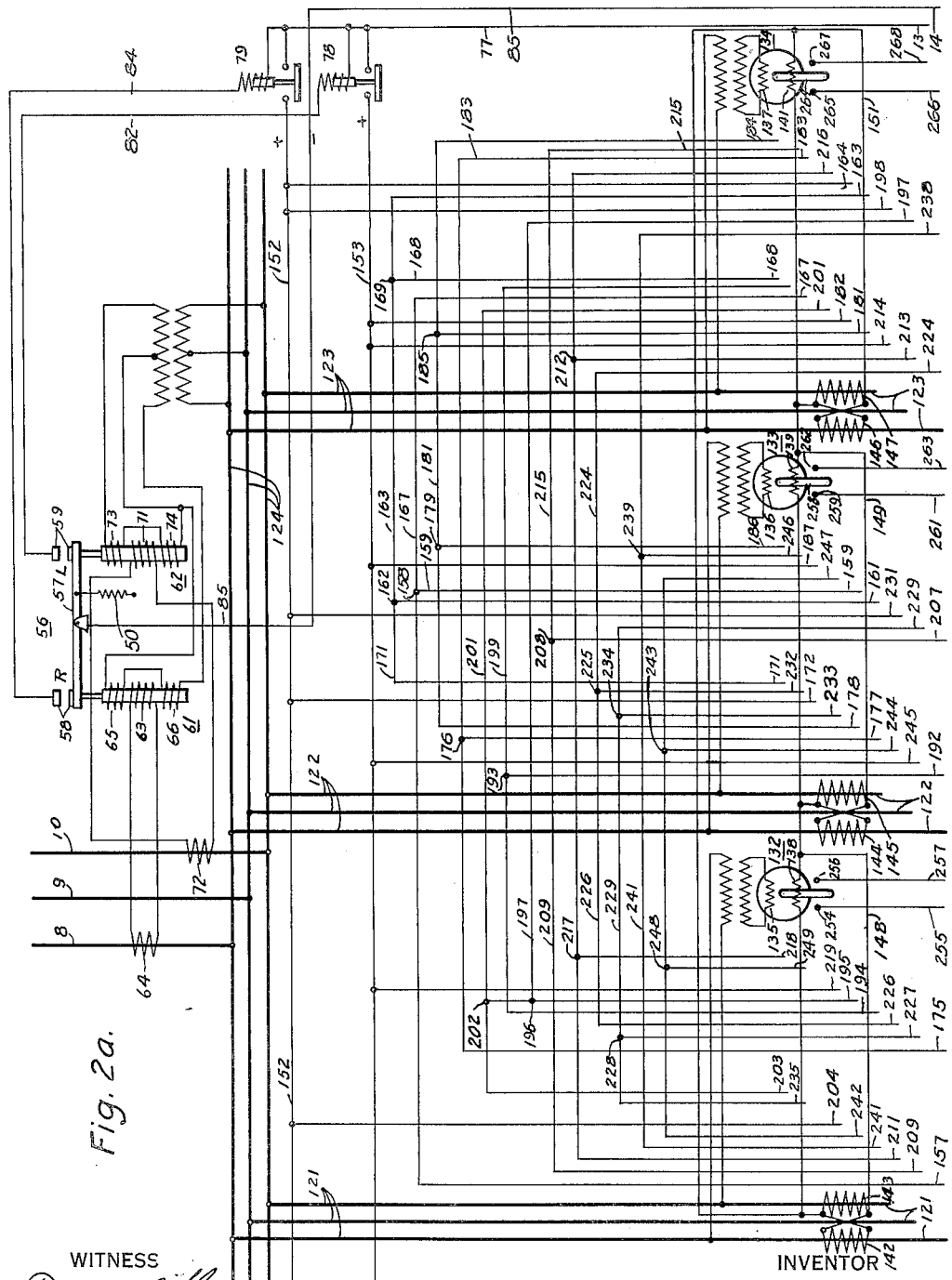
Figs. 2a and 2b are a diagram of circuits and apparatus illustrating another embodiment of my invention applied to a group of three generating units.
Figure 2B:
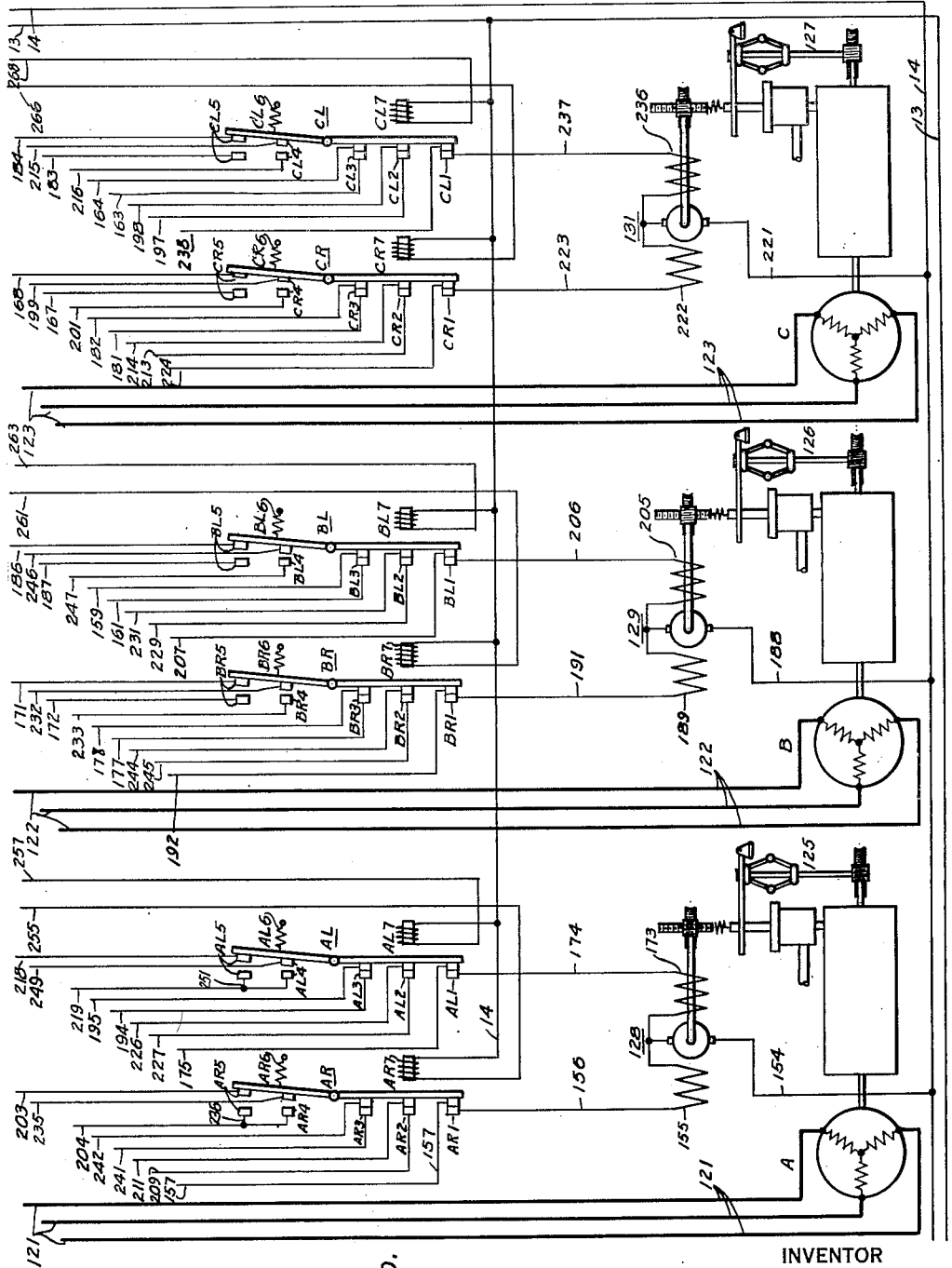

Referring to Figs. 2 and 3, a regulating system in accordance with my invention is illustrated as applied for use with three generators. The operation of the load relay 56 for actuating the direction determining relays 78 and 79 is the same as in the embodiment illustrated in Fig. 1. In this embodiment of the invention, three generators A, B and C are illustrated having output circuits 121, 122 and 123, respectively, connected to the station buses 124 supplying the circuit represented by conductors 8, 9 and 10 in response to which the load relay 56 is actuated. The three generating units are provided with governor mechanisms 125, 126, and 127, which may be similar in character to those illustrated for the prime movers 16 and 17 in Fig. 1. The load adjustments of these governor mechanisms are controlled by adjusting motors 128, 129 and 131, respectively, in accordance with the operation of the load relay 56 and of load balancing relays 132, 133 and 134 which are employed in place of the relay 80 in Fig. 1.

The load balancing relays 132, 133 and 134 are respectively provided with voltage windings 135, 136 and 137 connected to be energized from the output circuits of the generators A, B and C, respectively, and with current windings 138, 139 and 141 that are connected across the secondary windings of current transformers 142, 143; 144, 145; and 146, 147, respectively, associated with the output circuits from the corresponding generators. The secondary windings of the current transformers are so connected in a looped circuit that no voltage exists across the windings 138, 139 and 141 when a power balance exists between machines A, B and C. As will be noted, the bottom of the winding 143 is connected by conductor 148 to the top of the winding 145, the bottom of which is connected by conductor 149 to the top of the winding 147, the bottom of which is connected by conductor 151 to the top of the winding 143.

The motors 128, 129 and 131, respectively, for adjusting the setting of the three governing mechanisms 125, 126 and 127 are provided with opposed field windings for controlling the operation of the motor in opposite directions, the circuits being completed through switches AR and AL for the motor 128 controlled by the load balance relay 132, switches BR and BL for the motor 129 controlled by the load balance relay 133, and switches CR and CL for the motor 131 controlled by the load balance relay 134.

For convenience in tracing the circuits through the several switches the following system of designating the switches and parts is chosen; the first character representing the switch corresponds to that representing its associated generator A, B, or C, the second character, R or L indicates whether it controls the adjustment of the unit to raise or lower the input thereto, and the third character designates a part of the switch, the several pairs of cooperating contact members being indicated by numbers 1, 2, 3, 4 and 5, beginning from the bottom. The biasing spring for holding each switch arm in its illustrated positions is designated by the numeral 6, and the operating winding for actuating the switch to its second operative position, not illustrated, is indicated by the numeral 7. For example, AR7 indicates the operating winding of the switch associated with the unit A for increasing the input thereto, and BL5 represents the fifth or uppermost pair of contacts of the switch for controlling the lowering of the input to the unit B.

By noting the structural relationships of the parts of the switch as illustrated in Fig. 2, and noting the circuit through the several pairs of cooperating contact members which will be more easily done by reference to Fig. 3, the operation of the governor adjusting motors of the three units may be readily followed.

In the illustrated positions of the load balancing relays 132, 133 and 134 and of the switches AR, AL, BR, BL, CR and CL, those portions of the motor energizing circuits from the auxiliary conductors 152 and 153, to the supply conductor 14 are complete, so that, upon the operation of the directional relay 79 to connect conductor 152 to the supply conductor 13, all three motors will operate in a direction to raise the input to their respective generating units, while upon the operation of the relay 78 to its circuit closing position, the conductor 153 will be connected to the supply conductor 13 completing the circuit through each of the motors 128, 129 and 131 to operate them in a direction to decrease the output to the several prime movers.

The circuits between the supply conductor 14 and the auxiliary supply conductors 152 and 153, that are connected to the supply conductor 13 by the direction determining relays 78 and 79, respectively, will be most readily followed by reference to Fig. 3, in which the circuits between the several switch elements in Fig. 2 are illustrated. This fact should be kept in mind in comparing the two figures, since, for example, junction points shown in Fig. 3 for the sake of clearness as two separate points connected by a conductor may, in fact, be the same point on the conductor shown in Fig. 2, the important fact represented being that the several conductor portions or points are, electrically, the same conductor or point. For example, conductors 168 and 171 and junction point 169, together with conductors 161, 163 and junction point 162, form a conductor network whereby the appropriate side of the switches BR5, CR5, CL3 and BL3 are all connected to the same conductor network, the network acting as a single conductor element in tracing a circuit through the several switches.

In the illustrated positions of the several governor setting motor control switches AR, AL; BR, BL; and CR and CL, a circuit extends from the supply conductor 14 through conductor 154 to the armature winding of the motor 128 through the field winding 155 for energizing the motor to operate in a direction to raise or increase the power input to the prime mover through conductor 156, cooperating switch contact members AR1 in their circuit closing position, conductor 157, junction point 158, conductor 159, cooperating contact members BL3 in their circuit closing position, conductor 161, junction point 162, conductor 163, contact members CL3 in their circuit closing position, and conductor 164 to the auxiliary supply conductor 152, thus effecting operation of the motor 128 in a direction to increase the power input when the relay 79 is actuated to connect the auxiliary supply conductor 152 to supply conductor 13.

A circuit also extends from the junction point 158 by conductor 167 to the cooperating contact members CR5, shown in their open position, conductor 168 to junction point 169 and through conductor 171 to one side of the pair of cooperating contact members BR5 and by conductor 172 to the auxiliary supply conductor 152. The junction point 169 shown in the connection between the cooperating pairs of contact members CR5 and BR5 is, in effect, the same as the junction point 162 shown in the connection between the cooperating pairs of contact members BL3 and CL3, so that a circuit may be closed in shunt relation to the pairs of contact members BL3, through the pairs of contact members CR5, and a circuit may be closed in shunt relation to the pairs of contact members CL3 through the contact members BR5.

A circuit for operating the motor 128 in a direction to lower the power input of the prime mover unit associated therewith may be completed from the supply conductor 14, through conductor 154, the armature winding of the motor 128, the field winding 173 for actuating the motor in a power input decreasing direction, conductor 174, cooperating contact members AL1, conductor 175 to the junction point 176, conductor 177 to the cooperating pair of contact members BR3 shown in their circuit closing position, conductor 178, junction point 179, conductor 181, cooperating pairs of contact members CR3 shown in their circuit closing position, and conductor 182 to the auxiliary supply conductor 153. A circuit in shunt relation to the separate pairs of contact members BR3 and CR3 in the circuit just traced is provided extending from the junction point 176, by conductor 183, through the cooperating pairs of contact members CL5 shown in circuit interrupting position, conductor 184, junction point 185, conductor 186, cooperating pairs of contact members BL5 shown in their circuit interrupting position, and by conductor 187 to the auxiliary supply conductor 153. The junction points 179 and 185 are, in effect, the same point or conductor, so that, the circuit through the pair of contact members CL5 closes a circuit in shunt relation to the pair of contact members BR3, and the circuit through the contact members BL5 closes a circuit in shunt relation to the pair of contact members CR3.

The circuits for operating the motor 129 are similar to those for operating the motor 128, the circuit for operating the motor to increase the power input to its associated prime mover extending from the supply conductor 14 through conductor 188, the armature winding of the motor 129, the field winding 189 for actuating the motor in a power input increasing direction, conductor 191, cooperating pair of contact members BR1, the conductor 192, the junction point 193, conductor 194, cooperating pair of contact members AL3 shown in their circuit closing position, conductor 195, junction point 196, conductor 197, the pair of contact members CL2 and by conductor 198 to the auxiliary supply conductor 152. A branch or shunt circuit also extends from the junction point 193 by conductor 199, to the cooperating pair of contact members CR4, shown in their circuit interrupting position, conductor 201, to junction point 202, conductor 203 to the cooperating pair of contact members AR5 shown in their circuit interrupting position, and conductor 204 to the auxiliary supply conductor 152.

In the circuit just traced, it will be apparent, upon reference to Fig. 3, that the junction points 202 and 196 are, in effect, the same point or on the same conductor, so that, the pair of contact members CR4 closes a circuit in shunt relation to the pair of contact members AL3, and the pair of contact members AR5 closes a circuit in shunt relation to the pair of contact members CL2.

A circuit for actuating the motor 129 in a direction to decrease the power input to its associated prime mover extends from the supply conductor 14 by conductor 188, the armature winding of the motor 129, the field winding 205 for operating the motor in the appropriate direction, conductor 206, cooperating pair of contact members BL1, conductor 207, junction point 208, and conductor 209 through the cooperating pair of contact members AR2, shown in their circuit closing position, conductor 211, junction point 212, conductor 213 to the cooperating pair of contact members CR2, and by conductor 214 to the auxiliary supply conductor 153. A branch or shunt circuit also extends from the junction point 208 by conductor 215 to the cooperating pair of contact members CL4, shown in their circuit interrupting position, conductor 216, junction point 217, conductor 218, cooperating pair of contact members AL5 shown in their circuit interrupting position, and by conductor 219 to the auxiliary supply conductor 153. The junction points 212 and 217 are connected together, being, in effect, the same point or conductor so that the pair of contact members CL4 will close a circuit in shunt relation to the members AR2, and the pair of contact members AL5 will close a circuit in shunt relation to the contact members CR2.

A circuit for operating the governor setting motor 131 in a direction to increase the input to the generating unit C is traced from the supply conductor 14 through conductor 221, the armature of the motor 131, the field winding 222 for operating the motor 131 in the appropriate direction, the conductor 223, the cooperating pair of contact members CR1, conductor 224, junction point 225, conductor 226, to cooperating pair of contact members AL2 shown in their circuit closing position, conductor 227, junction point 228, conductor 229, cooperating pair of contact members BL2, shown in their circuit closing position, and by conductor 231 to the auxiliary conductor 152. A branch or shunt circuit extends from the junction point 225 by conductor 232 to the pair of cooperating contact members BR4, shown in their circuit interrupting position, the conductor 233, junction points 234, conductor 235 to the cooperating pair of contact members AR4, shown in their circuit interrupting position, and by conductor 236 to the supply conductor 152. The junction points 228 and 234 are, in effect, the same points being on the same conductor so that the contact members BR4 close a circuit in shunt relation to the contact members AL2 and the contact members AR4 close a circuit in shunt relation to the contact members BL2.

A circuit for operating the motor 131 in a direction to decrease the power input to the generating unit C may be traced from the supply conductor 14 by conductor 221, through the armature winding of the motor 131, the field winding 236 for operating the motor in the appropriate direction, conductor 237, cooperating pair of contact members CL1, conductor 238, junction point 239, conductor 241, cooperating pair of contact members AR3, conductor 242, junction point 243, conductor 244, cooperating pair of contact members BR2, conductor 245 to the auxiliary supply conductor 153. A circuit in shunt to the pairs of contact members AR3 and BR2 extends from the junction point 239 by conductor 246, cooperating pair of contact members BL4, conductor 247, junction point 248, conductor 249, cooperating pair of contact members AL4, shown in their circuit interrupting position, and conductor 251 to the auxiliary supply conductor 153. The junction points 243 and 248 being on the same conductor are, in effect, the same point.

The circuits for energizing the electromagnets for actuating the several switches AR, AL, BR, BL, CR and CL to their second operative positions for reversing the relations of the circuits controlled thereby from that shown in the illustrated positions of the several switches may be traced as follows. A conductor 252 extends from the supply conductor 13 connecting the movable contact members of the several load balancing relays 132, 133 and 134 therewith. Upon movement of the contact member 253 of the load balancing relay 132 to engage the contact member 254, a circuit is completed through conductor 255 and the winding AR7 of the switch AR to the supply conductor 14 for actuating the switch AR away from its illustrated position, closing circuits through its pairs of contact members AR4 and AR5, shown in their circuit interrupting position, and interrupting circuits through those pairs of contact members, AR1, AR2, and AR3, shown in their circuit closing positions. Upon movement of the contact member 253 to interrupt the circuit through the conductor 255, the switch AR is again actuated by the biasing member AR6 to its illustrated circuit closing position, and upon movement of the contact member 253 to engage the contact member 256, a circuit is completed through the conductor 257 and the winding AL7 of the switch AL to the supply conductor 14 for so operating the switch AL as to cause engagement of the cooperating pairs of contact members AL4 and AL5 and to separate the cooperating pairs of contact members AL1, AL2 and AL3.

The load balancing relay 133 controls similar circuits for operating the switches BR and BL extending from the movable contact member 258, contact member 259, conductor 261, winding BR7 to the supply conductor 14 for operating the switch BR away from its illustrated position, and a circuit extending from the contact member 258 through the contact member 262, conductor 263 and winding BL7 to supply conductor 14, for operating the switch BL away from its illustrated position, thus causing separation of the cooperating pairs of contact members BL1, BL2 and BL3 and engagement of the cooperating contact members BL4 and BL5.

The circuit for operating the switch CR extends from the moving contact member 264 of the load balancing relay 134, through contact member 265, conductor 266, the winding CR7 to the supply conductor 14, for operating the switch CR to separate the cooperating pairs of contact members CR1, CR2 and CR3 and causing engagement of the cooperating contact members CR4 and CR5.

Engagement of the moving contact member 264 of the load balancing relay 134 with the contact member 267 closes a circuit through the conductor 268, and the winding CL7 to supply conductor 14, for actuating the switch CL from its illustrated position, separating the cooperating pairs of contact members CL1, CL2 and CL3, and causing engagement of the cooperating pairs of contact members CL4 and CL5.

As pointed out above, when a proper balance exists between the loads of the several generating units and the several switches are in the positions illustrated in Figs. 2 and 3, the closing of the direction determining relays 78 or 79 by the load controlling relay 56 will cause operation of all of the governor setting motors 128, 129 and 131 in the proper direction. If the load on the unit A increases to cause an unbalance between the loads of the several units, the load balance relay 132 will be actuated to cause engagement of the contact members 253 and 254, thus energizing the winding AR7 and operating the switch AR to its second operative position. It will be noted that this definitely interrupts the circuit through the pair of cooperating contact members AR1 preventing operation of the motor 128 in a direction to increase the power input to the unit A. Operation of the switch AR to its second illustrated position also interrupts the circuit through the cooperating pair of contact members AR2, which is in the circuit for actuating the motor 129 in a power input decreasing direction, and opens the circuit through the pair of contact members AR3 in the circuit for operating the motor 131 in a power input decreasing direction.

If, the other motor control switches remaining as illustrated, operation of the switch AR, as above described, in response to an increase in the load on the generating unit A, with respect to the desired balance between the several generating units, definitely prevents operation of the motor 128 in a direction to increase the load on the unit A, and prevents operation of the motors 129 and 131 in directions to cause a decrease in the power input to the units B and C. Should, therefore, the relay 79 close in response to the operation of the relay 56 in a direction to raise the power input to the units as a group, this increase in power would be effected by operations of the motors 129 and 131 only, thus increasing the power input to the generators B and C. While should the relay 78 operate in response to an impulse from the load relay 56 to decrease the power output of the group of generators, the motor 128 only would operate, to decrease the power input to the generator unit A.

Exactly similar circuits will be set up with respect to the other of the three units, upon operation of either of the load balancing relays 133 or 134 in a direction to energize the operating windings BR7 and CR7 of the switches BR and CR. Also exactly similar switching operation would be made upon operation of either of the load balancing relays 132, 133 or 134 in a direction to energize the windings AL7, BL7 and CL7 of the switches AL, BL and CL for controlling the operation of the motors 128, 129 and 131, respectively, in a direction to lower the input to their respective generating units A, B and C.

If the loads on the three units becomes unbalanced in such manner that the load on the unit A is too high, the load on the unit B is an intermediate or correct value, and the load on the unit C is too low, the switch AL will be controlled by the load balancing relay 132 to operate in the manner above described, and the switch CL will be controlled by the load balancing relay 134 to operate to its second circuit closing position, thus interrupting the circuit to the motor 131 through the pair of contact members CL1 to prevent lowering of the load on the unit C, and cause engagement of the cooperating pairs of contact members CL4 and CL5 in the control circuits of the motors 129 and 128, respectively, for actuating them in directions to decrease the load input to their respective generating units. The pairs of cooperating contact members CL3 in the circuit for controlling the motor 128 to an input increasing direction and the cooperating contact members CL2 for controlling the motor 129 in a power input increasing direction are likewise operated to their circuit interrupting positions.

If, now, the load relay 56 operates to increase the power input to the group of generators, closing the relay 79, the circuit to the motor 128 in a power increasing direction is interrupted at two points CL3 and AR1 preventing operation of this motor in that direction. In the circuit for operating the motor 129 in a direction to increase the power input to the generator unit B, the pair of contact members CL2 are now separated and would thus interrupt this circuit, except for the fact that the contact members AR5, that are in shunt relation thereto, have been closed by the switch AR. A circuit is thus completed from the auxiliary supply conductor 152 through cooperating pairs of contact members AR5, AL3 and BR1 to operate the motor 129 in a direction to increase the power input of the unit B. A circuit from the supply conductor 152 now extends through the previously traced circuit including the contact members BL2 and CL1 in their illustrated closed positions, the contact members AR4 being also in their closed position so that the motors 129 and 131 will both operate in power increasing directions.

If, with the switches AR and CL in the assumed positions, the load control relay 56 operates in a position to decrease the load on the group of units, thus closing the relay 78, a circuit will be completed from the auxiliary supply conductor 153 through the control circuit for the motor 128 through the pairs of contact members CR3, BR3 and AL1, all of which are in their illustrated or closed positions. The contact members CL5 are also in their circuit closing positions. A circuit will also be completed to operate the motor 129 in a direction to decrease the power input to the generator B, this circuit extending from the auxiliary supply conductor 153 through pairs of contact members CR2, CL4 and BL1, the contact members AR2 being separated. The circuit for operating the motor 131 in a power input decreasing direction has been interrupted by the contact members CL1 so that the motors 128 and 129 only will so operate.

With the assumed positions of the switches AR and CL just described, the motor 128 will operate only in a direction to decrease the power input to its associated unit, motor 129 will operate in either direction, and the motor 131 will operate only in a direction to increase the power input to its associated unit.

As will appear from the above description of the motor control circuits, and from reference to the diagrammatic representation of the circuits in Fig. 3, the lowermost illustrated cooperating pairs of contact members AR, AL, etc., definitely interrupt the control operation of their associated motor, while the other pairs of cooperating contact members, controlled by the switches associated with the other two units, jointly operate to complete or interrupt the circuit to the particular motor. For example, in the case of motor 128, separation of the pair of contact members AR1 controlled by switch AR definitely prevents operation of the motor 128 in a load increasing direction, while if the contact members AR1 are in their circuit closing position, the circuit from the junction point 158 to the auxiliary supply conductor 152 may be interrupted by either the pair of contact members BL3, or CL3, associated with the switches for preventing the lowering of the input to the units B and C, respectively, or the branch circuit from the point 158 to the conductor 152 may be completed by closing either the contact members CR5 or BR5 associated with the switches for preventing an increase in the power input to the units C and B, respectively.

It will be noted that the pair of contact members CR5 can be operated to their circuit closing position only when the contact members CL3 are in their circuit closing position, since these contact members are actuated from their illustrated positions by opposite circuit controlling positions of the load balancing relay 134, and also that the contact members BR5 can be operated to a circuit closing position only when the contact members BL3 are already in their circuit closing position, since these two pairs of contact members can be operated from their illustrated positions only upon opposite positions of the load balancing relay 133. Closing of either of the pairs of contact members BR5 or CR5 will, therefore, insure a circuit from the auxiliary supply conductor 152 to the junction point 158 to insure operation of the motor 128 unless the contact members AR1 are in their circuit interrupting positions. This same relation exists through all the several motor increasing and motor decreasing circuits with respect to all branch circuits through cooperating pairs of contact members illustrated as being in their circuit interrupting positions.

Since many modifications may be made in the circuits and apparatus illustrated, without departing from the spirit of my invention, I do not wish to be limited otherwise than by the scope of the appended claims.

I claim as my invention:

1. In combination, a plurality of electrical generators operating in parallel circuit relation, individual prime movers for driving the several generators, means associated with each prime mover for varying the power input thereto, means responsive to a regulated quantity resulting from the operation of said generators for controlling the power input to said prime movers, and means responsive to load unbalance between said several generators for selecting certain of said generators only to respond to specific variations in power input.

2. In combination, a plurality of electrical generators operatively connected for supplying power to the same circuit, a separate prime mover for driving each of said generators, means associated with each prime mover for varying the power input thereto, means responsive to a regulated quantity determined by the joint output of said several generators for controlling the power input to said prime movers, and means responsive to the relative condition of loading among said several machines for determining which of said several prime movers shall respond to specific variations in power input.

3. In combination, a plurality of electrical generators operatively connected for supplying power to the same circuit, a separate prime mover for driving each of said generators, means associated with each prime mover for varying the power input thereto, means responsive to the output of said group of generators for controlling the power input to said prime movers, and means responsive to unbalanced loading conditions among said several generators for temporarily limiting the effect of said output responsive means to selected prime mover units for specific variations in power input.

4. In combination, a plurality of electrical generators operatively connected for supplying power to the same circuit, a separate prime mover for driving each of said generators, means associated with each prime mover for varying the power input thereto, means responsive to the power output of said group of generators for controlling the power input to said prime movers, and means responsive to a variation in the power output ratio between said several machines from a desired relationship for selecting one of said prime mover units to be controlled in response to a requirement for an increase in the power output of the group, and another one of said prime mover units to be controlled in response to a requirement for a decrease in the power output of the group.

5. In a regulating system, a power circuit, a plurality of electric generators connected to the power circuit, a prime mover for supplying power to each of said generators, a governor for controlling the speed of each prime mover, adjusting means for varying the setting of each governor, means responsive to the group output of said generators for varying the settings of said governor mechanisms, and means responsive to load unbalance between said generators for selecting certain of said governor mechanisms to respond to specific variations in the output of said several generators.

6. In a regulating system, a power circuit, a plurality of electric generators connected to the power circuit, a separate prime mover for supplying power to each of said generators, means associated with each prime mover for governing the power input thereto, electroresponsive means for varying the setting of said governing means, means responsive to the output from said several generators for controlling the electroresponsive means, and means responsive to the load balance between said several generators for presetting control circuits to said electroresponsive means for selecting certain of said prime movers to respond to a required power decrease from the group.

7. In a regulator system, a power circuit, a plurality of electric generators connected to the power circuit, a separate prime mover for supplying power to each of said generators, means associated with each prime mover for governing the power input thereto, electroresponsive means associated with each governing means for adjusting the setting thereof, a load responsive relay actuated in accordance with the total power output from said several generators, a pair of directional relays controlled thereby for selectively controlling operation of said several electroresponsive means in the power-input increasing and power-input decreasing directions, and means sensitive to load balance among said several generators for preventing the power-input increasing directional relay from being effective with respect to a generator from which the output is too high and for preventing the power-input decreasing directional relay from being effective with respect to a generator from which the output is too low.

LAWRENCE L. FOUNTAIN.